United States Patent [19]

Ogle

[11] Patent Number: 4,533,558

[45] Date of Patent: Aug. 6, 1985

[54] TOASTING PROCESS USING A TOAST GUARD

[76] Inventor: David W. Ogle, 5 Sunset La., Bushnell, Ill. 61422

[21] Appl. No.: 685,206

[22] Filed: Dec. 24, 1984

Related U.S. Application Data

[62] Division of Ser. No. 593,611, Mar. 26, 1984, abandoned.

[51] Int. Cl.³ .............................................. A23B 4/04
[52] U.S. Cl. ..................... 426/466; 426/520; 99/391; 99/401; 219/521; 219/531; 428/428; 501/94
[58] Field of Search ............... 219/343, 461, 462, 521, 219/524, 525, 531; 99/385, 388, 389, 391, 400, 401, 447; 426/465, 466, 467, 469, 472; 428/15, 428, 542.8, 933; 501/94; 106/313; 126/22, 41 R; 165/104.15; 264/56; D7/328

[56] References Cited

U.S. PATENT DOCUMENTS

| | | | |
|---|---|---|---|
| 432,340 | 7/1890 | Thurston | 126/22 |
| 904,382 | 11/1908 | Van Patten | 99/391 |
| 1,720,800 | 7/1929 | Morrison | 99/328 |
| 1,729,552 | 9/1929 | Shadley et al. | 99/391 |
| 2,821,127 | 1/1958 | Hess | 99/389 |
| 3,058,259 | 10/1962 | Kripak | 428/15 X |
| 4,233,348 | 11/1980 | Corry | 428/15 |
| 4,268,581 | 5/1981 | De Boel | 428/428 |
| 4,276,869 | 7/1981 | Kern | 126/41 R |
| 4,280,044 | 7/1981 | Princevalle | 219/462 |
| 4,396,825 | 8/1983 | Cox et al. | 219/521 |

FOREIGN PATENT DOCUMENTS 448858  12/1974  U.S.S.R. ............................... 99/401

Primary Examiner—Volodymyr Y. Mayewsky
Attorney, Agent, or Firm—Wm. T. Metz

[57] ABSTRACT

A toast guard made of a heat absorbent ceramic piece molded in the shape of a slice of bread, but slightly smaller in size and thickness than a slice of bread. The ceramic piece is used in the toasting process of an ordinary multi-slotted household toaster when some of the slots of the toaster are filled with slices of bread and some of the slots are vacant. The ceramic piece enables the toast to be darkened to the same degree on both sides and prevents the excessive darkening or burning of the side of the toast adjacent to a vacant slot in the toaster.

1 Claim, 2 Drawing Figures

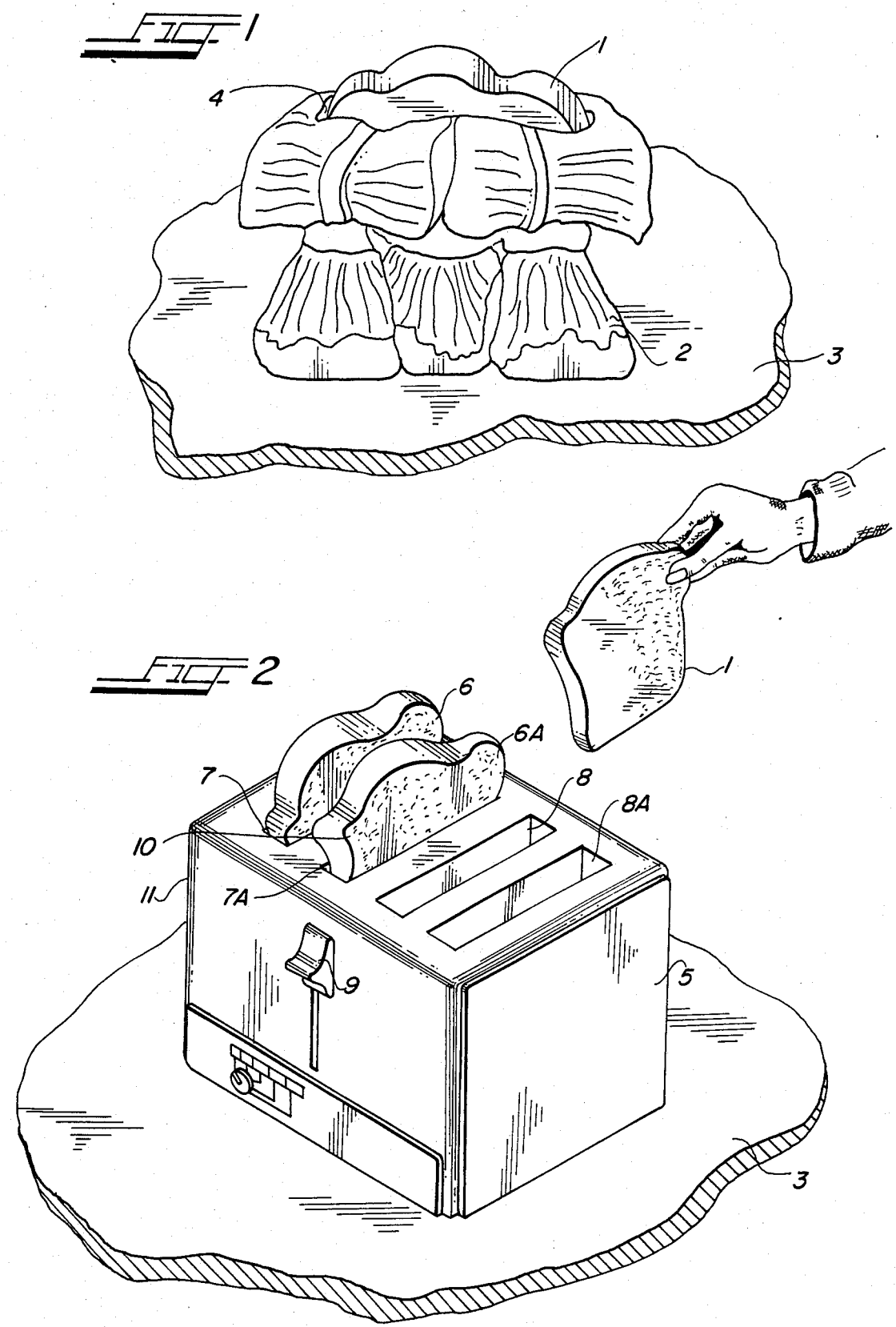

TOASTING PROCESS USING A TOAST GUARD

This is a division of application Ser. No. 593,611 filed on Mar. 26, 1984, now abandoned.

BACKGROUND OF THE INVENTION

1. Field of the Invention

This invention pertains to the toasting of bread in household toasters and the like and more particularly to a means to enable bread to be toasted evenly and thus darkened to the same degree on each side when a multi-slotted toaster is used and one or more of the several slots in the multi-slotted toaster is left vacant.

2. Description of the Prior Art

Heretofore bread toasters having several slots for the toasting of several slices of bread at one time have had the disadvantage that when toasting bread in only one or several of the toasting slots and leaving vacant slots, the bread that is nearest a vacant toasting slot tends to darken or burn to a greater degree on the side near the unoccupied toasting slot. This is true for the simplest household toaster being able to toast only one or two slices at one time, the larger household toaster and also for commercial toasters that will toast a larger number of slices of bread at one time.

The following U.S. patents are in the opinion of the inventor and upon the advice of counsel the closest prior art of which the inventor is aware:

| | |
| --- | --- |
| Thurston | 432,340 |
| Van Patten | 904,382 |
| Morrison | 1,720,800 |
| Shadley et al | 1,729,552 |
| Princevalle | 4,280,044 |

As can be seen by reference to the enclosed copies of the above prior art none of the prior art discloses the toast guard shown in the present application. Thurston discloses a heat screen made of a non-heat conducting material for shielding the top of bread that is being baked in an over. Van Patten discloses a means for toasting bread, among other items, in which it is desired to apply the heat simultaneously and uniformly to both sides of the object to be broiled, roasted or toasted and shows a heat shield below the object to be broiled, roasted or toasted. Morrison discloses a means to prevent the outer edges of slices of bread from becoming scorched or burned by serrated shields which are placed between the heat source and the bread to be toasted. Shadley et al discloses a combination broiler and toaster lined with fire bricks which direct the heat toward the toast. Princevalle discloses a heat absorbing and radiating device for use under the surface heating elements of electric stoves which is designed to increase the efficiency of the heating element rather than to protect the surface of the reflector pan. None of the above patents disclose a ceramic piece which will absorb heat to prevent toast from darkening or burning more on one side than the other when vacant slots are left while toasting bread in a multi-slotted toaster.

SUMMARY OF THE INVENTION

It is, therefore, an object of this invention to provide a toast guard for multi-slotted toasters which will enable toast to be darkened to the same degree on both sides when toast is prepared in only one or several of the slots of a multi-slotted toaster leaving vacant slots in the toaster.

It is a further object of this invention to provide a toast guard for multi-slotted toasters which may be stored near the toaster and be used as required.

Further objects of this invention will be come apparent from the following drawing, description and claims.

BRIEF DESCRIPTION OF THE DRAWING

FIG. 1 shows the toast guard standing in an ornamental holder ready for use.

FIG. 2 shows the toast guard being inserted into a multi-slotted toaster in which several slices of bread are to be toasted and several slots are left vacant.

DESCRIPTION OF THE PREFERRED EMBODIMENT

The toast guard is comprises of a ceramic piece 1 that is molded in the shape of a slice of toast but is slightly smaller in size and thickness than a normal slice of toast. The ceramic piece 1 is fired and glazed so as to be heat absorbing. A holder 2 that is in the form of stacked wheat shocks is also made of ceramic and is designed to rest on a table or similar surface 3 near a toaster 5. A slot 4 in the holder 2 receives the ceramic piece 1 when the ceramic piece 1 is not in use as a toast guard.

Slices of bread 6 and 6A are placed in slots 7 and 7A of the toaster 5 for toasting. The ceramic piece 1 is inserted in slot 8 adjacent to the outermost slice of bread 6A. The lever 9 which lowers the slices of bread 6 and 6A into the toaster 5 is then depressed, lowering the slices of bread 6 and 6A and the ceramic piece 1 into the toaster 5 and turning on the heating elements (not shown) of the toaster 5. There are heating elements between each of the slots 7, 7A, 8 and 8A in the toaster 5 and also on the ends of the outermost slots 7 and 8A of the toaster 5. The ceramic piece 1 absorbs the excess heat created by the heating elements on both sides of slot 8. This prevents side 10 of the slice of bread 6A adjacent to the heating element between slot 7A and slot 8 from becoming darker than the rest of the bread in the toasting process. It also prevents side 10 from possibly burning due to excessive heat from the heating element between slots 7A and 8.

If the ceramic piece 1 is not inserted in slot 8 adjacent to the outermost slice of bread 6A to be toasted it is found that the slice of bread 6A is darkened more or possibly burned on the side 10 of the slice of bread 6A adjacent to the heating element between slot 7A and slot 8. It is the discovery of this inventor that the use of the ceramic piece 1 in the toaster 5 in connection with the toasting of slices of bread 6 and 6A will prevent the outermost side 10 of slice of bread 6A from being darkened more than the other sides of the slices of bread 6 and 6A. Also it is the discovery of this inventor that the use of the ceramic piece 1 in the toaster 5 will prevent the outermost side 10 from burning in the toasting process. Should slices of bread be toasted in center slots 7A and 8 of the toaster 5 the ceramic piece 1 is placed in slot 7 and a second ceramic piece similar in shape and design to ceramic piece 1 is placed in slot 8A.

This prevents the side of the slice of bread to be toasted in slot 7A that is adjacent to slot 7 from becoming darker than the other side of that slice of bread and the side of the slice of bread to be toasted in slot 8 that is adjacent to slot 8A from becoming darker than its other side. However, almost always toast is made in the slots at one end or the other of the toaster 5 and only one ceramic piece 1 need be used. It is inserted in the vacant slot of the toaster 5 adjacent to the slot which is occupied by a slice of bread. The slice of bread 6 in the slot 7 will not be darkened more on the side adjacent to the end 11 of the toaster 5 than the other side of the slice of bread 6. Also the side of the slice of bread 6 which is adjacent to slot 7A will not be unduly darkened since the slice of bread 6A occupies slot 7A.

The toasting process is a process wherein heat is applied uniformly to both sides of a piece of bread, causing it to darken or burn to a certain degree. When a slice of bread is inserted in a slot of a multi-slotted toaster and a vacant slot is left next to the slice of bread to be toasted, the heat applied to the side of the slice of bread adjacent to the vacant slot will be greater than the heat applied to the other side of that slice of bread, thus causing uneven darkening or toasting of the slice of bread. The use of the ceramic piece 1 as described above will cause the heat applied to the slice of bread adjacent to the vacant slot to be the same as the heat applied to the other side of the slice of bread adjacent to the vacant slot.

The reason that the ceramic piece is slightly smaller and thinner than a slice of bread is the relative density of a slice of bread and ceramic. If the ceramic piece were the same size as a slice of bread it would absorb too much heat and thus cause the side of the slice of bread adjacent to the ceramic piece to turn out lighter in the toasting process than its other side.

I claim:

1. A process to enable slices of bread to be toasted evenly on each side in a multi-slotted toaster when only some of the slots of the multi-slotted toaster are used, comprised of inserting the slices of bread in some of the slots of the toaster, inserting a ceramic piece molded in the shape of a slice of bread which is fired and glazed so as to be heat absorbing and slightly smaller in size and thickness than a slice of bread in a vacant slot of the toaster adjacent a slot in which a slice of bread is inserted and then activating the toasting mechanism of the toaster.

* * * * *